United States Patent
Brisimi et al.

(10) Patent No.: US 11,966,993 B2
(45) Date of Patent: Apr. 23, 2024

(54) LAND USE PLANNING RECOMMENDATIONS USING HETEROGENEOUS TEMPORAL DATASETS

(71) Applicant: INTERNATIONAL BUSINESS MACHINES CORPORATION, Armonk, NY (US)

(72) Inventors: Theodora Brisimi, Dublin (IE); Martin Stephenson, Ballynacargy (IE); Marco Luca Sbodio, Castaheany (IE)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 16/660,484

(22) Filed: Oct. 22, 2019

(65) Prior Publication Data
US 2021/0118073 A1 Apr. 22, 2021

(51) Int. Cl.
| | |
|---|---|
| G06Q 50/16 | (2012.01) |
| G06Q 10/04 | (2023.01) |
| G06Q 30/0202 | (2023.01) |
| G06Q 30/0204 | (2023.01) |

(52) U.S. Cl.
CPC ........... *G06Q 50/165* (2013.01); *G06Q 10/04* (2013.01); *G06Q 30/0202* (2013.01); *G06Q 30/0205* (2013.01)

(58) Field of Classification Search
None
See application file for complete search history.

(56) References Cited

U.S. PATENT DOCUMENTS

| | | | |
|---|---|---|---|
| 7,353,113 B2 | 4/2008 | Sprague et al. | |
| 8,732,219 B1 | 5/2014 | Ferries | |
| 10,115,158 B2 | 10/2018 | Lindores | |
| 2004/0117777 A1* | 6/2004 | Lichana | G06Q 50/26 717/151 |
| 2006/0015374 A1* | 1/2006 | Ochs | G06Q 40/00 705/4 |
| 2006/0025971 A1* | 2/2006 | Detwiler | G06F 30/13 703/1 |
| 2006/0282228 A1 | 12/2006 | Avey et al. | |
| 2006/0282467 A1 | 12/2006 | Peterson et al. | |

(Continued)

FOREIGN PATENT DOCUMENTS

| | | |
|---|---|---|
| CN | 104992260 A | 10/2015 |
| CN | 108304969 A | 7/2018 |

OTHER PUBLICATIONS

Thakur, "Demonstrating PlanetSense: Gathering Geo-Spatial Intelligence from Crowd-sourced and Social-media Data," 2016, Proceedings of the 24th ACM Sigspatial International Conference on Advances in Geographic Information Systems, pp. 1-4 ( Year: 2016).*

(Continued)

*Primary Examiner* — Ivan R Goldberg
(74) *Attorney, Agent, or Firm* — Stephanie L. Carusillo

(57) ABSTRACT

Embodiments for providing intelligent land use planning recommendations using heterogeneous temporal datasets in a computing environment. One or more positive land-use interventions, one or more negative land-use interventions, or a combination thereof may be recommended for a selected geographical region from heterogeneous chronological data.

15 Claims, 12 Drawing Sheets

(56) References Cited

U.S. PATENT DOCUMENTS

| | | | | |
|---|---|---|---|---|
| 2013/0325878 | A1* | 12/2013 | de Lichana | G06F 16/22 |
| | | | | 707/748 |
| 2015/0100285 | A1 | 4/2015 | Heidinger | |
| 2016/0063516 | A1* | 3/2016 | Terrazas | G06Q 30/0201 |
| | | | | 705/7.29 |
| 2016/0232621 | A1* | 8/2016 | Ethington | G06Q 50/02 |
| 2017/0083747 | A1* | 3/2017 | Guan | G06V 20/188 |
| 2018/0189564 | A1* | 7/2018 | Freitag | G06F 18/214 |
| 2018/0211156 | A1* | 7/2018 | Guan | G06Q 50/02 |
| 2018/0293671 | A1* | 10/2018 | Murr | G01W 1/10 |
| 2018/0330487 | A1* | 11/2018 | Cohen | G06Q 50/02 |
| 2019/0108640 | A1* | 4/2019 | Zhang | G06T 7/11 |
| 2019/0133026 | A1* | 5/2019 | Seaman | G06Q 50/02 |
| 2019/0304026 | A1* | 10/2019 | Lyman | G06Q 50/165 |
| 2019/0362147 | A1* | 11/2019 | Adam | G06K 9/00711 |
| 2020/0150631 | A1* | 5/2020 | Frieberg | A01C 21/007 |

OTHER PUBLICATIONS

Yang, "An integrated view of data quality in Earth observation," 2013, In Philosophical Transactions of the Royal Society A: Mathematical, Physical and Engineering Sciences, vol. 371, pp. 1-16 (Year: 2013).*

Priya, "Crop prediction on the region belts of India: A Naïve Bayes MapReduce precision agricultural model," 2018, In 2018 International Conference on Advances in Computing, Communications and Informatics (ICACCI), IEEE, pp. 99-104 (Year: 2018).*

"Spatial decision support system for land assessment." C. Nehme and M. Simoes., In Proceedings of the 7th ACM international symposium on Advances in geographic information systems (GIS '99), C. Medeiros (Ed.). ACM, 85-90, 1999, (6 Pages).

"Extreme learning machine", Wikipedia, Last Edited Jul. 23, 2023, Printed Nov. 6, 2023, 9 pages, <https://en.wikipedia.org/wiki/Extreme_learning_machine>.

"Move to your best place to live and work", Teleport, Printed Nov. 6, 2023, 2 pages, <https://teleport.org/>.

"Peer City Identification Tool", Federal Reserve Bank of Chicago, Printed Nov. 6, 2023, 1 page, <https://www.chicagofed.org/region/community-development/data/pcit>.

Zhang et al., "ELM Meets Urban Big Data Analysis: Case Studies", Hindawi Publishing Corporation, Computational Intelligence and Neuroscience, vol. 2016, Article ID 4970246, Aug. 1, 2016, 10 pages, <https://www.ncbi.nlm.nih.gov/pmc/articles/PMC5021905/>.

* cited by examiner

LAND USE PLANNING RECOMMENDATIONS USING HETEROGENEOUS TEMPORAL DATASETS

BACKGROUND OF THE INVENTION

Field of the Invention

The present invention relates in general to computing systems, and more particularly to, various embodiments for providing intelligent land use planning recommendations using heterogeneous temporal datasets in a computing environment by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. For example, processing devices, with the advent and further miniaturization of integrated circuits, have made it possible to be integrated into a wide variety of devices. As great strides and advances in technologies come to fruition, these technological advances can be then brought to bear in everyday life. For example, the vast amount of available data made possible by computing and networking technologies may then assist in improvements to quality of life and appropriate living conditions.

SUMMARY OF THE INVENTION

Various embodiments for providing intelligent land use planning recommendations using heterogeneous temporal datasets are provided. In one embodiment, by way of example only, a method for providing intelligent land use planning recommendations using heterogeneous temporal datasets, again by a processor in an Internet of Things (IoT) computing environment is provided. One or more positive land-use interventions, one or more negative land-use interventions, or a combination thereof may be recommended for a selected geographical region from heterogeneous chronological data.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
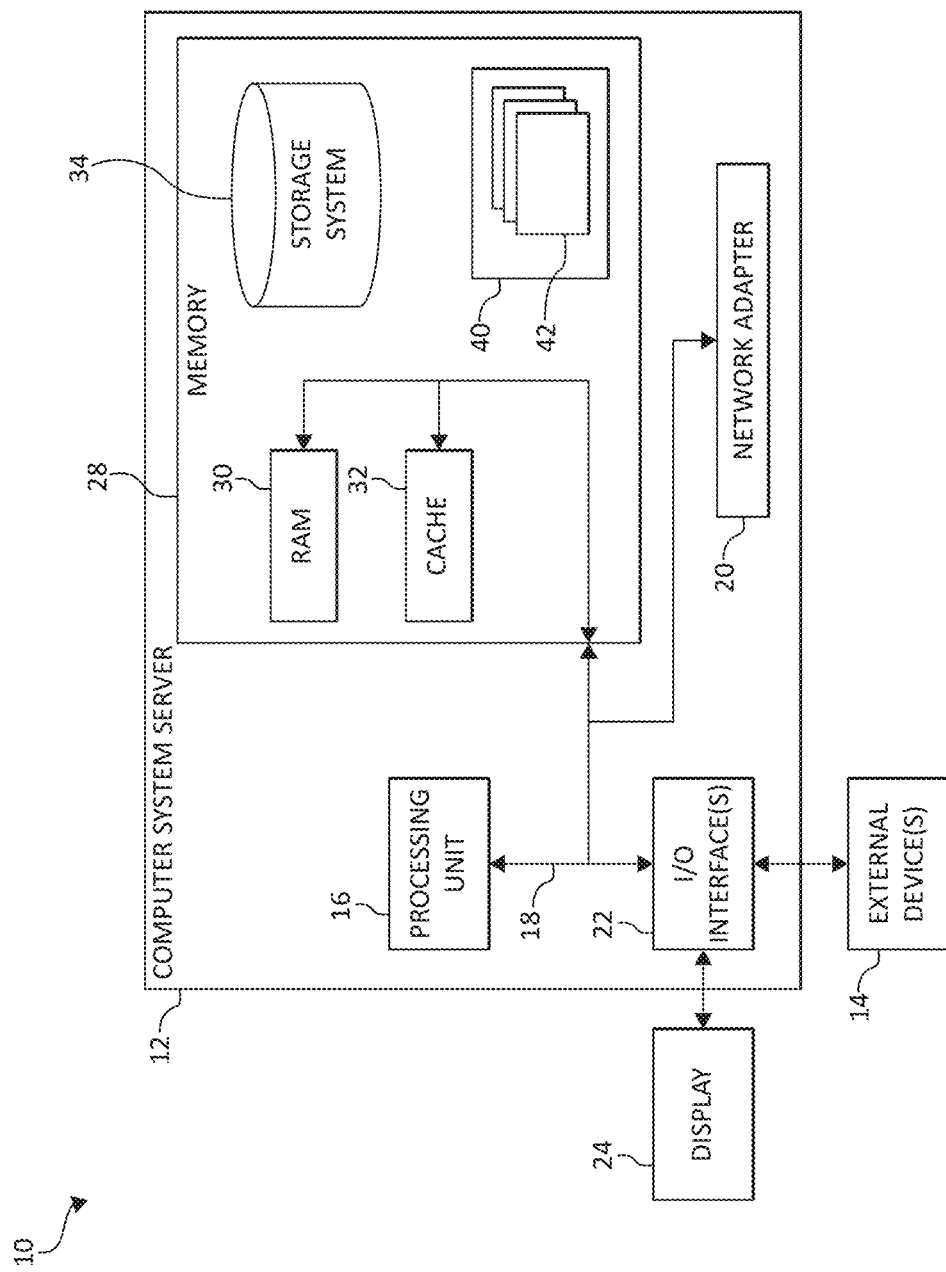
FIG. 1 is a block diagram depicting an exemplary computing node according to an embodiment of the present invention.

As a preliminary matter, computing systems may include large scale computing called "cloud computing," in which resources may interact and/or be accessed via a communication system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

Turning now to various aspects of the present invention, it should be noted that highly heterogeneous and chronological data (e.g., "heterogeneous chronological data") related to a given geographic area are currently available in large amounts. Such data include, for example, textual description of an area, textual description of activities going on and/or occurring in the area, public or social media network posts on social media networks, images/pictures, quantitative data (for example pollution levels, traffic, economic indices, etc.), and past planning data. Land-use planners can take advantage of such heterogeneous data to make better informed decisions, but challenges arise for sieving through all the vast amount of data, and distilling the sieved data into an actionable format. For example, a major challenge occurs when attempting to capture all the heterogeneous data of a geographical area where there are multiple dimensions (e.g., structured and unstructured data) with values changing over time.

Accordingly, the present invention provides a novel solution by summarizing the heterogeneous data related to a geographical area into a machine processable representation, which enables the computation of recommendations to assist a user (e.g., a land-use planners) in identifying and/or locating potentially useful or positive interventions for a geographical area and/or negative interventions to avoid for a geographical area such as, for example, in urban or city areas. In one aspect, the present invention is applicable to a domain of smart agriculture to help identifying an optimal or "best use" for agricultural land (e.g., where, when, and/or how much to grow/harvest a particular crop or resource).

In an additional aspect, the present invention provides for intelligent land use planning using heterogeneous datasets in general computing environment and/or an Internet of Things (IoT) computing environment. One or more positive land-use interventions, one or more negative land-use interventions, or a combination thereof may be recommended for a selected geographical region from heterogeneous chronological data.

Also, the present invention provides for intelligent land use planning using heterogeneous datasets by recommending a list of positive land-use interventions, and a list of negative land-use interventions for a given geographical area using heterogeneous chronological data. The lists of recommendations may be determined and/or computed by identifying other geographical areas that have characteristics/features that are similar to the geographical area given in input.

Similarity among geographical areas may also be determined/computed based on heterogeneous chronological data including both structured and unstructured data in a given input time interval. A set of possible land-use interventions (either positive or negative) may be learned over time by extracting information from an evolving corpus of texts. The polarity (positive/negative) of a recommended land-use intervention may be learned from one or more data sources (e.g., texts describing positive polarity identified as interventions to performed/executed and/or negative polarity identify interventions to avoid. A user (e.g., a land-use planner) may express feedback about the lists of recommendations such feedback may be collected, stored, and/or used to improve future recommendations. Also, each recommendation may be associated to an explanation providing evidence of why a land-use intervention is recommended as positive/negative for the given input geographical area. A user interface may be provided to allow the user (land-use planner) to interact therewith, and interactions may include, for example, selecting input geographical areas and time intervals, examining the recommendations and their explanations, and providing feedbacks.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, "best," "appropriate," and/or "optimize" may be used herein interchangeable and refer to and/or defined as "maximize," "minimize," or attain one or more specific targets, objectives, goals, or intentions. "Best," "appropriate," and/or "optimize" may also refer to maximizing a benefit to a user (e.g., maximize a health state/patient profile). "Best," "appropriate," and/or "optimize" may also refer to making the most effective or functional use of a situation, opportunity, or resource.

Additionally, "best," "appropriate," and/or "optimize" may need not refer to a best solution or result but may refer to a solution or result that "is good enough" for a particular application, for example. In some implementations, an objective is to suggest a "best" combination of land use intervention recommendations, but there may be a variety of factors that may result in alternate suggestion of a combination of sections of one or more land use intervention recommendations better results. Thus, some changes to the variety of factors may result in a jump from one minimum/maximum to another minimum/maximum. In either case, resulting suggestions of a combination of land use intervention recommendations may be considered "good enough," "substantially optimal," and/or "sufficiently good." Herein, the terms "best," "appropriate," and/or "optimize" may also refer to such results based on minima (or maxima, depending on what parameters are considered in the optimization problem) for suggesting of a combination of land use intervention recommendations.

In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

As used herein, so-called "appropriateness" or "inappropriateness" of land use intervention recommendations associated may be subjective and context dependent. For example, one solution for an appropriate combination of land use intervention recommendations may be interpreted and evaluated to be either satisfactory or unsatisfactory depending on one or more contextual factors. Accordingly, the so-called "appropriateness" of a particular combination of land use intervention recommendations may depend greatly upon contextual factors, such as a weather data, land use data, and/or activities, environmental factors, social factors, religious factors, cultural factors, and other contextual factors. A deeper, cognitive analysis of the land use intervention recommendations may be provided to further understand the user and/or interpret the appropriate combination of land use intervention recommendations.

It should be noted as described herein, the term "intelligent" (or "intelligence") may be relating to, being, or involving conscious intellectual activity such as, for example, thinking, reasoning, or remembering, that may be performed using a machine learning. In an additional aspect, cognitive or "intelligence" may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, intelligent or "intelligence" may refer to a mental action or process of acquiring knowledge and understanding through thought, experience, and one or more senses using machine learning (which may include using sensor-based devices or other computing systems that include audio or video devices). Intelligent or "intelligence" may also refer to identifying patterns of behavior, leading to a "learning" of one or more events, activities and/or operations, or processes.

In additional aspect, the term intelligent may refer to an intelligent system (e.g., a cognitive system). The intelligent system may be a specialized computer system, or set of computer systems, configured with hardware and/or software logic (in combination with hardware logic upon which the software executes) to emulate human intelligent/cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. An intelligent system may perform one or more computer-implemented artificial intelligence ("AI") operations that approximate a human thought process while enabling a user or a computing system to interact in a more natural manner. An intelligent system may comprise artificial intelligence logic, such as natural language processing (NLP) based logic, for example, and machine learning logic, which may be provided as specialized hardware, software executed on hardware, or any combination of specialized hardware and software executed on hardware. The logic of the intelligent system may implement the intelligent operation(s), examples of which include, but are not limited to, question answering, identification of related concepts within different portions of content in a corpus, and intelligent search algorithms, such as Internet web page searches.

In general, such intelligent systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
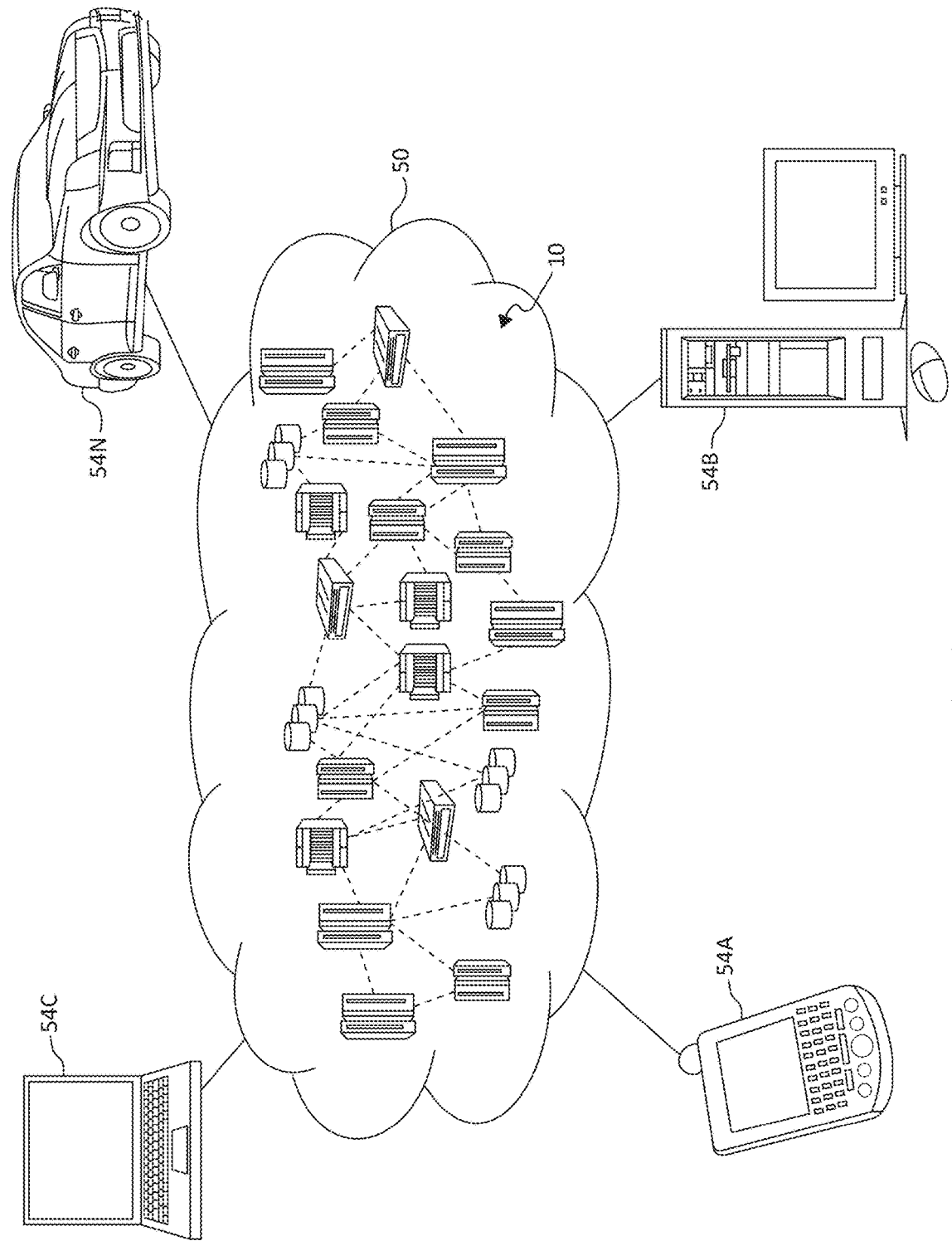
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
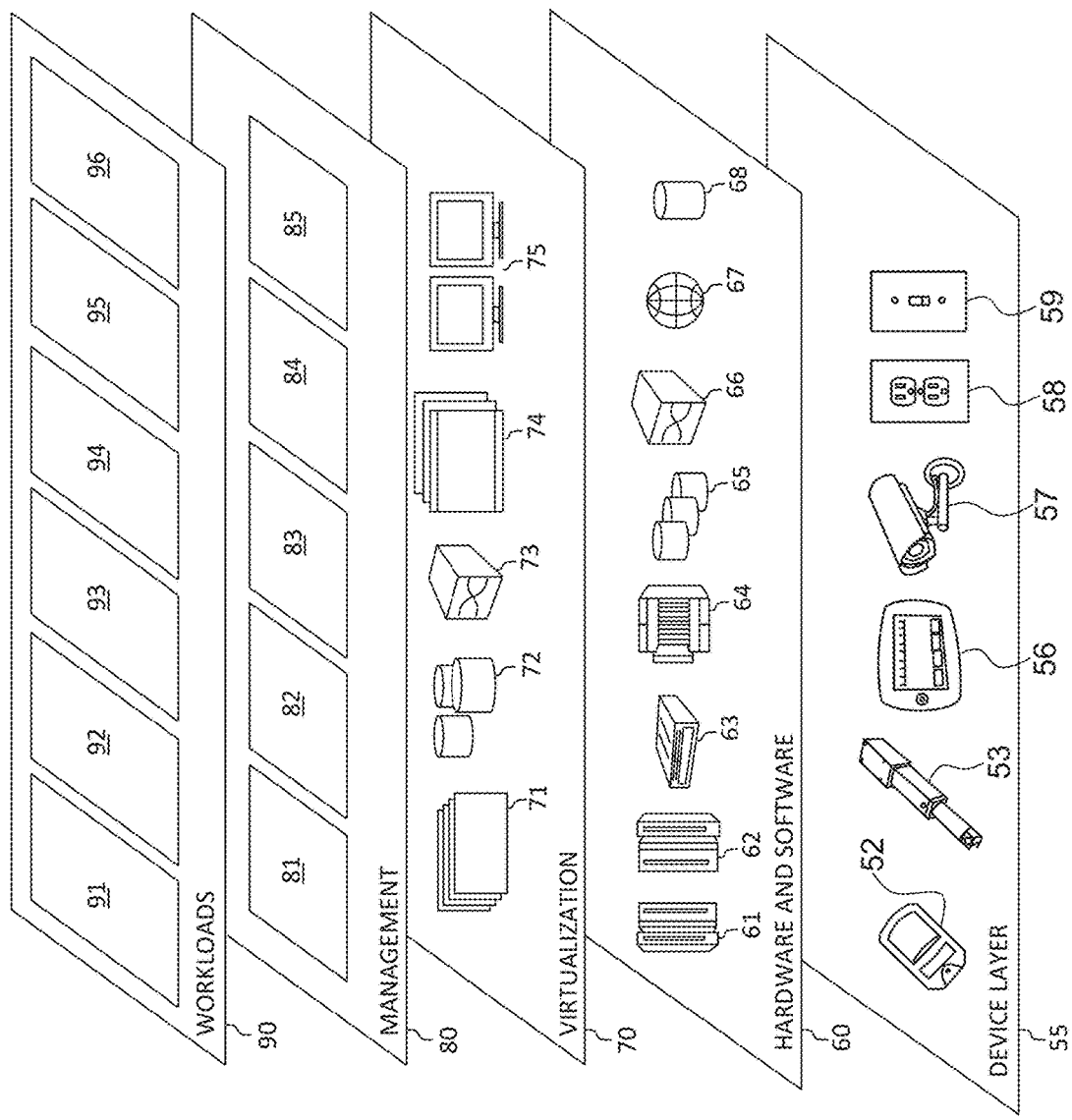
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96. In addition, workloads and functions 96 for providing intelligent land use planning recommendations using heterogeneous temporal datasets may include such operations as data analytics, data analysis, and as will be further described, notification functionality. One of ordinary skill in the art will appreciate that the workloads and functions 96 for providing intelligent land use planning recommendations using heterogeneous temporal datasets may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
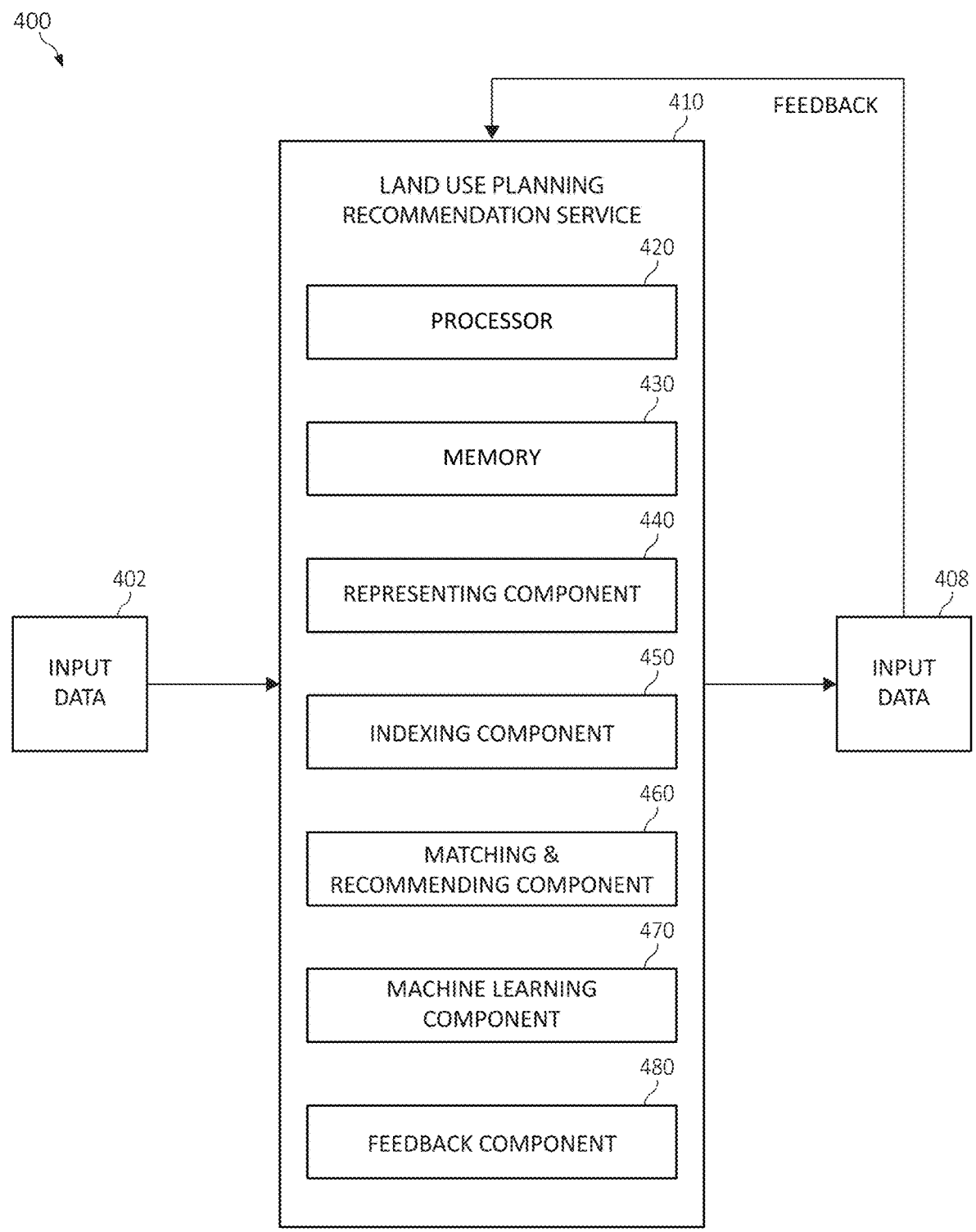
FIG. 4 is an additional block diagram depicting an exemplary functional relationship between various aspects of the present invention.

Turning now to FIG. 4, a block diagram depicting exemplary functional components of an intelligent planning system 400 according to various mechanisms of the illustrated embodiments, is shown. In one aspect, one or more of the components, modules, services, applications, and/or functions described in FIGS. 1-3 may be used in FIG. 4.

A land use planning recommendation service 410 is shown, incorporating at least one processing unit 420 ("processor") to perform various computational, data processing and other functionality in accordance with various aspects of the present invention. The processing unit 420 may be in communication with memory 430. A representing component 440, an indexing component 450, a matching and recommending component 460, a machine learning component 470, and a feedback component 480 is shown, each of which may also be in communication with and/or controlled by the processor 420.

In one aspect, the functional components of the intelligent planning system 400 illustrates a feedback loop with one or more various inputs 402 used by the land use planning recommendation service 410 to generate an output 408 of recommending a list of positive and/or negative land-use interventions from heterogenous datasets.

Also, the functional components 400 may use a feedback loop for updating data of the land use planning recommendation service 410 based a user feedback, IoT device feedback, and/or feedback relating to the recommended list of positive and/or negative land-use interventions from heterogenous datasets.

As one of ordinary skill in the art will appreciate, the depiction of the various functional units in land use planning recommendation service 410 is for purposes of illustration, as the functional units may be located within the land use planning recommendation service 410 or elsewhere within and/or between distributed computing components. As previously stated, the land use planning recommendation service 410 may operate in a closed loop environment by receiving one or more inputs 402 into the land use planning recommendation service 410 and providing one or more outputs 408 for customize traversal route generation. In one aspect, the land use planning recommendation service 410 may operate in a cloud environment.

For example, the inputs 402 may include, for example, various land use data, mapping information, multiple metrics/parameters data, weather data/pollution data, environmental factors, traffic parameters/data, route profiles, activity data (e.g., activities associated with land use such as, for example, amusement parks, building/construction activities/operations, sporting/entertainment events, utility service operations, etc.), road work or repair, traffic congestion patterns and data, travel services, retail or commercial businesses, various online data sources, social media network/social media accounts contextual data, historical data, and the like, may be integrated together using the land use planning recommendation service 410 to recommended list of positive and/or negative land-use interventions from heterogenous datasets.

Using the input data 402, the representing component 440 may represent the heterogeneous chronological data of the selected geographical region as images. The machine learning component 470 may train and classify the images using a machine learning operation. The machine learning component 470 may train and classify the images using a machine learning operation. The indexing component 450 may index both data of the images and associated text data describing land-use interventions in the selected geographical region.

The matching and recommending component 460 may recommend one or more positive land-use interventions, one or more negative land-use interventions, or a combination thereof for a selected geographical region from heterogeneous chronological data.

The matching and recommending component 460 may identify one or more geographical regions having one or more similar characteristics or features to the selected region. The matching and recommending component 460 use the heterogeneous chronological data is used to identify the one or more similar characteristics or features. The heterogeneous chronological data includes both structured data and unstructured data. The matching and recommending component 460 may associate one or more positive land-use interventions, the one or more negative land-use interventions, or a combination thereof to support data or non-support data. Thus, the matching and recommending component 460 may recommend a list of positive land-use interventions and a list of negative land-use interventions of similar geographical areas and providing supporting evidences with the list of positive land-use interventions and the list of negative land-use interventions.

The machine learning component 470 may learn the one or more positive land-use interventions, the one or more negative land-use interventions, or a combination thereof from one or more data sources during a selected time period.

The feedback component 480 may collect feedback data relating to the one or more positive land-use interventions, the one or more negative land-use interventions, or a combination.

The output 408 may be one or more recommended lists of positive and/or negative land-use interventions from heterogenous datasets.

As one of ordinary skill in the art will appreciate, the land use planning recommendation service 410 may implement mathematical modeling, probability and statistical analysis or modeling, machine reasoning, probabilistic logic, text data compression, or other data processing technologies to carry out the various mechanisms of the illustrated embodiments. In one aspect, calculations may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

In one aspect, the machine learning component 470 may be used to reason and interact with a user. The reasoning may include employing an artificial intelligence system to "reason" with the user. The reasoning may include justifying (e.g., providing support/evidence for the recommended lists of positive and/or negative land-use interventions from heterogenous datasets in a language format such as, for example, audible or written communication) to the user the "reason" or support for each suggestion. The reasoning may include learning the various recommended lists of positive and/or negative land-use interventions from heterogenous datasets.

In one aspect, the various functional units in the machine learning component 470 may apply to one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
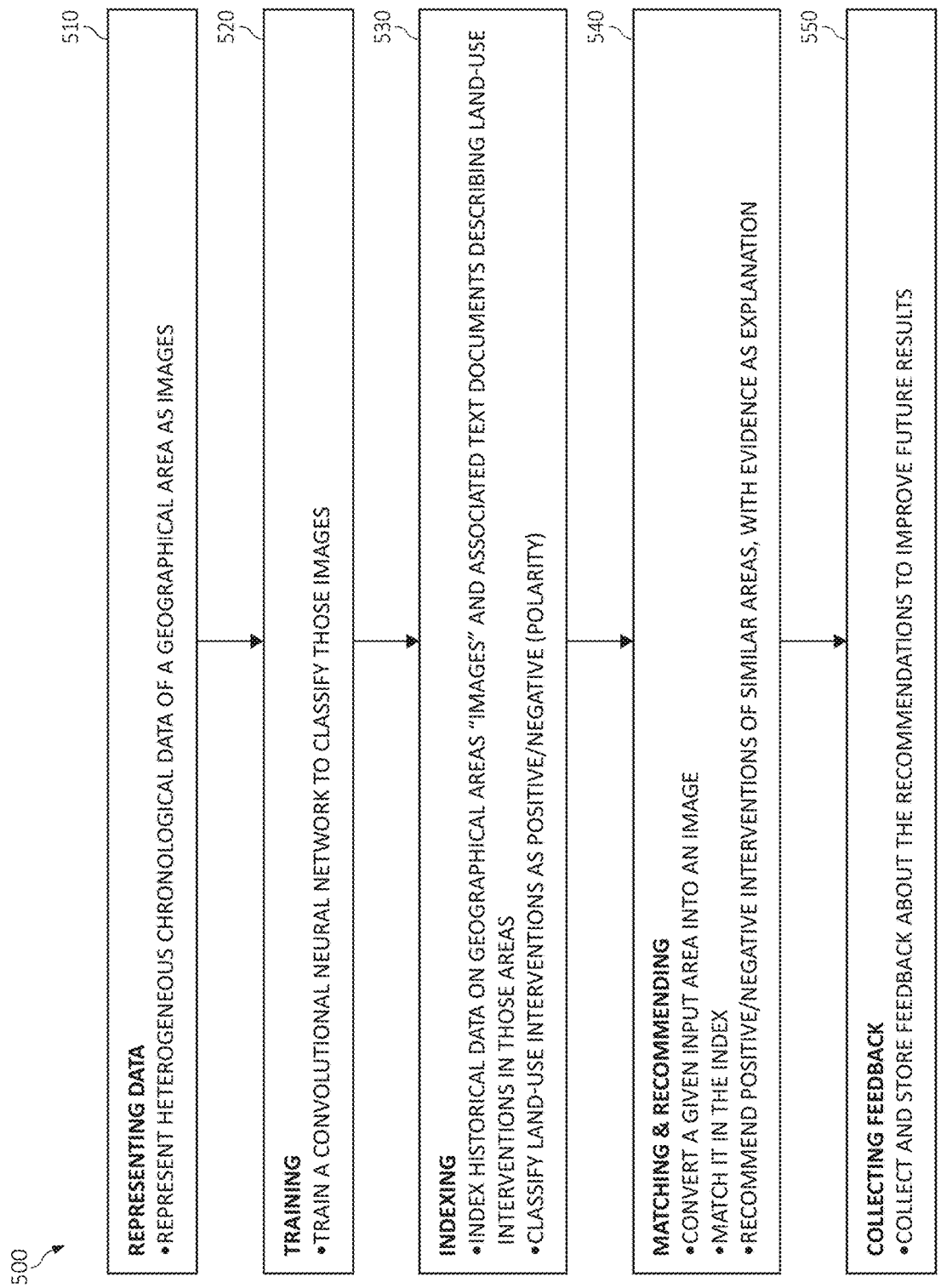
FIG. 5 is a flowchart diagram depicting an exemplary method for providing intelligent land use planning recommendations using heterogeneous temporal datasets in a computing environment by a processor in which aspects of the present invention may be realized.

Turning now to FIG. 5, a method 500 for providing intelligent land use planning recommendations using heterogeneous temporal datasets in a computing environment by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium.

Figure 6:
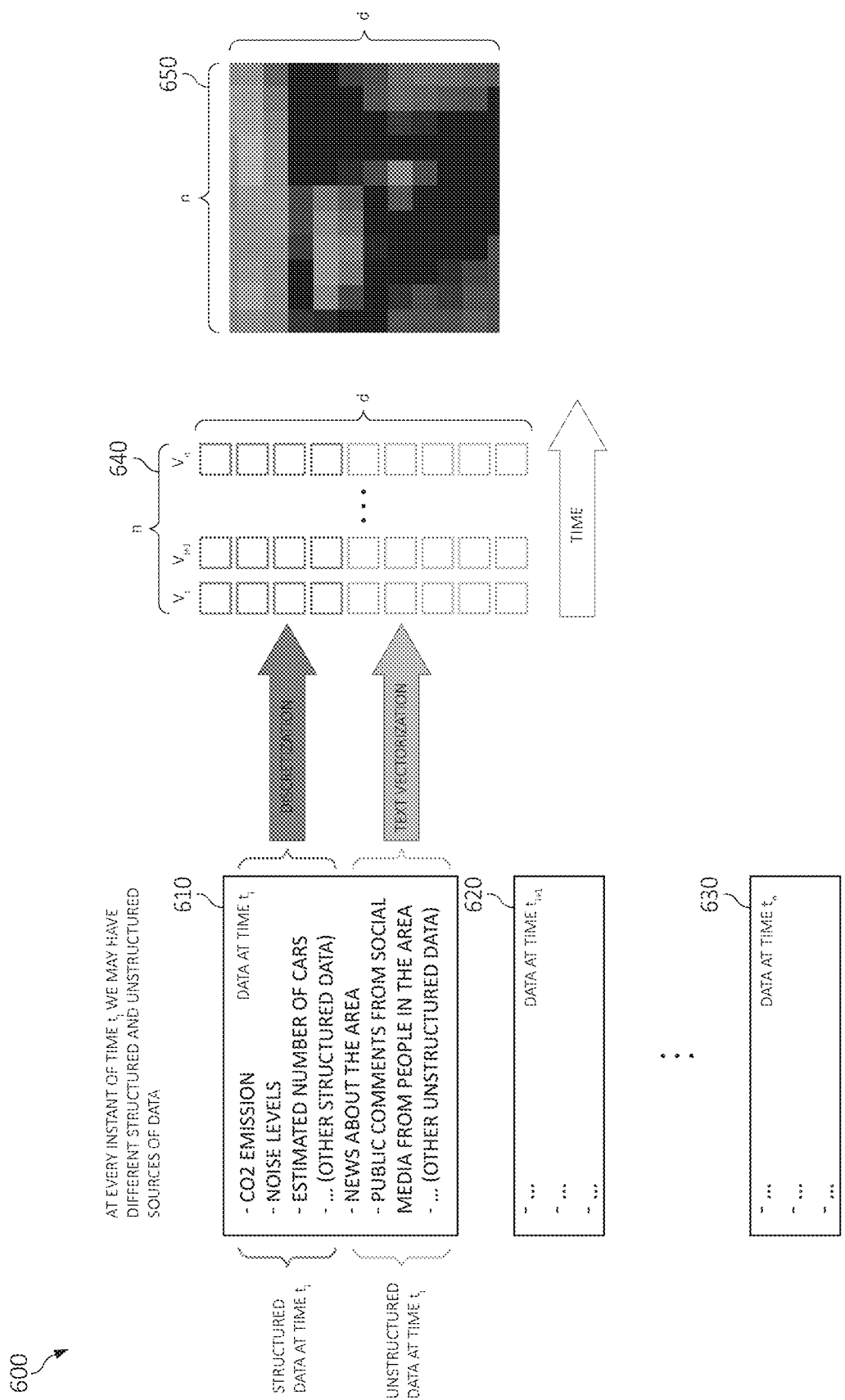
FIG. 6 is an additional block diagram depicting representing heterogeneous datasets related to a geographical area by a processor in which aspects of the present invention may be realized.

The functionality 500 may start in block 510 by representing data. That is, block 510 may represent heterogeneous chronological data of a graphical area (e.g., selected graphical region) as one or more images, as indicated in FIG. 6. A machine learning operation (e.g., a convolutional neural network) may be used to train and classify the one or more images, as in block 520 (see FIG. 7).

An indexing operation may be performed, as in block 530. That is, historical data on geographical areas (including images and associated text data, and text documents that describe land use interventions in the geographical areas) may be indexed. The land use interventions may be classified as either positive land use interventions or negative land use interventions ("polarity").

A matching and recommending operation may be performed, as in block 540. The matching and recommending operation may include, for example, converting a selected/given input geographical area into an image and matching the selected/given input geographical area in the index (of block 530 above). The matching and recommending operation may include, for example, recommending positive and/or negative land use interventions of similar areas (e.g., similar characteristics, similar features, etc.) along with providing evidence as support and/or as an explanation.

Feedback information may be collected, as in block 550. The feedback information may be collected and stored relating to each of the recommendations so as to improve subsequent recommendations (e.g., future recommendations).

Turning now to FIG. 6, a block diagram 600 is depicted representing heterogeneous datasets related to a geographical area by a processor. In one aspect, one or more of the components, modules, services, applications, and/or functions described in FIGS. 1-5 may be used in FIG. 6. Repetitive description of like elements, components, modules, services, applications, and/or functions employed in other embodiments described herein is omitted for sake of brevity.

As depicted in FIG. 6 for representing heterogeneous datasets related to a geographical area, at each time instant of time "$t_i$", there may be various types of data such as, for example, structured and unstructured sources of data 610. Thus, a matrix $M_{i,n}$ 640 of size d and n (e.g, d×n) may represent heterogeneous chronological data of a graphical area (e.g., selected graphical region) as one or more image such as, for example, image 650 of the size d and n (e.g., d×n).

In general, column j of the matrix $M_{i,n}$ of size d and n (e.g, d×n) (e.g., matrix $M_{i,n}$ 640) represents data snapshot at time $t_i$ with i≤j≤n. The matrix $M_{i,n}$ 640 may be used as an image (of size d×n), which encodes all the information (structured and unstructured) about the geographical area from time $t_i$ to time $t_n$.

More specifically, as depicted in FIG. 6, the structured and unstructured sources of data 610 may be included in the column $V_i$ of the matrix $M_{i,n}$ 640, and each time instant of time "$t_i$" such as, for example, data instance 620 at $t_{i+1}$ may be included in column $V_{i+1}$, and data instance 630 at $t_n$ may be included in column $V_n$ of the of the matrix $M_{i,n}$ 640. It should be noted, by way of example only, the upper portion of the columns show discretization of the structured data while the lower portions of the columns included text vectorization of the data unstructured data. In one aspect, operations for text vectorization may use one or more various types of operations such as, for example, counting frequencies of words with term frequency—inverse document frequency ("TFIDF"), vectors of hash words (e.g., hashing vectorizer in python), and/or learning documents embedding with doc2vec.

Figure 7:
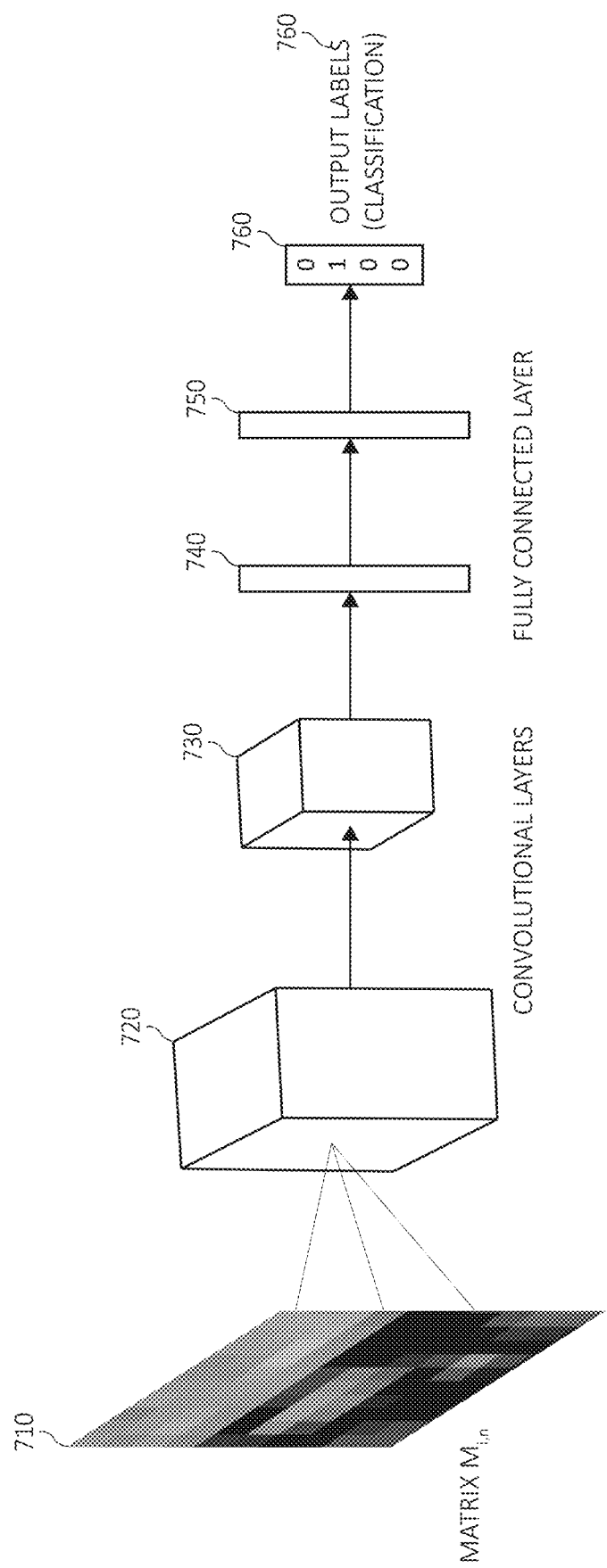
FIG. 7 is an additional block diagram depicting representing heterogeneous datasets related to a geographical area by a processor in which aspects of the present invention may be realized.

Turning now to FIG. 7, block diagram 700 depicts classifying operations of representing heterogeneous datasets related to a geographical area. In one aspect, one or more of the components, modules, services, applications, and/or functions described in FIGS. 1-6 may be used in FIG. 7. Repetitive description of like elements, components, modules, services, applications, and/or functions employed in other embodiments described herein is omitted for sake of brevity.

One or more machine learning operation (e.g., a convolutional neural network or "CNN") such as, for example, a convolutional neural network may be used to train and classify the one or more images. For example, the image 710 may be generated from the matrix $M_{i,n}$ 640 of FIG. 6. The image 710 may be classified using the convolutional neural network to produces output labels 760 (e.g., classification). That is, the classifying operations of representing heterogeneous datasets related to a geographical area may be using the convolutional neural network layers 720-750.

FIG. 8A-8D are an additional block diagram depicting various operations 800, 825, 835, and 845 (e.g., a training phase 800, an indexing phase 825, a matching and recommendation phase 835, and a feedback phase 845) of a computing system for providing intelligent land use planning recommendations using heterogeneous temporal datasets. In one aspect, one or more of the components, modules, services, applications, and/or functions described in FIGS. 1-7 may be used in FIGS. 8A-8D. Repetitive description of like elements, components, modules, services, applications, and/or functions employed in other embodiments described herein is omitted for sake of brevity. It should be noted that the computing system may be provided by the computer system/server 12 and may include a data extractor module 814, a data matrix image builder module 816, a CNN 818, an indexer module 822, an intervention polarity detection module 826, a matching and recommendation module 834, an intervention extractor module 828, and/or a feedback collection module 842, each of which may be in communication and/or association with various databases such as, for example, a geolocated chronological structured data 810, geolocated chronological unstructured data 812, an index of encoded geographical areas and interventions 824, and/or a feedback database.

Figure 8A:
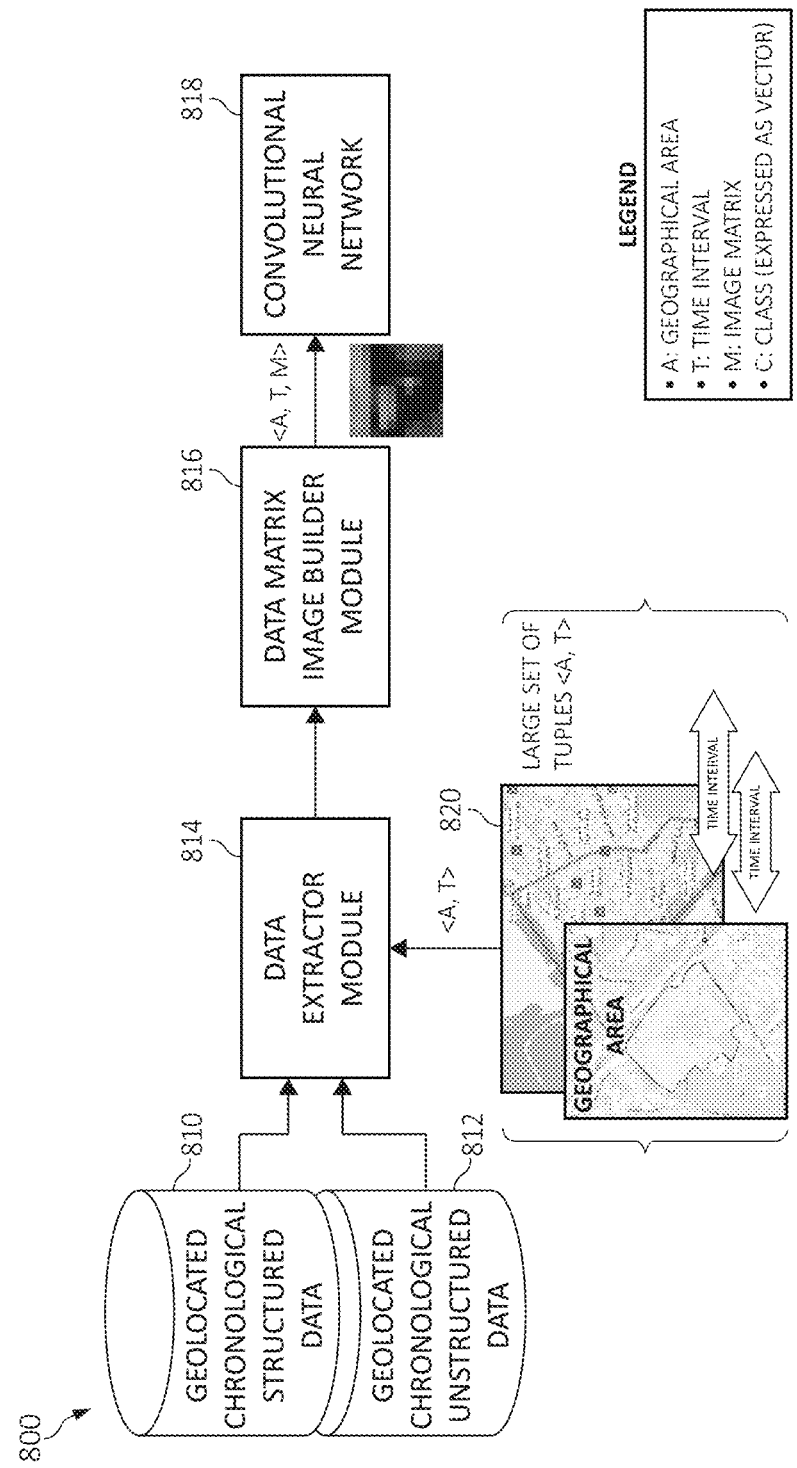
FIG. 8A-8D are an additional block diagram depicting various operations for providing intelligent land use planning recommendations using heterogeneous temporal datasets by a processor in which aspects of the present invention may be realized.

Turning now to FIG. 8A, a training phase 800 is depicted where the present invention may learn to classify chronological data of geographical areas. For example, in a training phase, a large set of tuples 820 of a geographical area and a time interval may be received as input into the data extractor module 814 from the geolocated chronological structured data 810 and/or geolocated chronological unstructured data 812, where "A" is a geographical area, and "T" is a time interval. It should be noted that the data extractor module 814 may be based on various data extraction tools. It should be noted that set of tuples 820 refers to the set of tuples ("<A,T>") and input 832 refers to a single tuple of ("<A, T>").

For each set of tuples 820 (e.g., tuple A and tuple T), the data (structured and unstructured from the geolocated chronological structured data 810 and/or geolocated chronological unstructured data 812) related to A within time interval T may be extracted by the data extractor module 814. The data matrix image builder module 815 may encode the data into an image matrix M (e.g., "M" is the image matrix") such as, for example, the matrix $M_{i,n}$ 640 of FIG. 6. The image matrix M such as, for example, the matrix $M_{i,n}$ 640 of FIG. 6 may be used to train the CNN 818 (see the convolutional neural network of FIG. 7), which operates as a classifier and associates a class C (where variable "C" represents the class that may be expressed as vector) to the image matrix M such as, for example, the matrix $M_{i,n}$ 640 of FIG. 6. The training phase may be repeated periodically to improve the accuracy of the classification (re-training of the CNN 818).

Figure 8B:
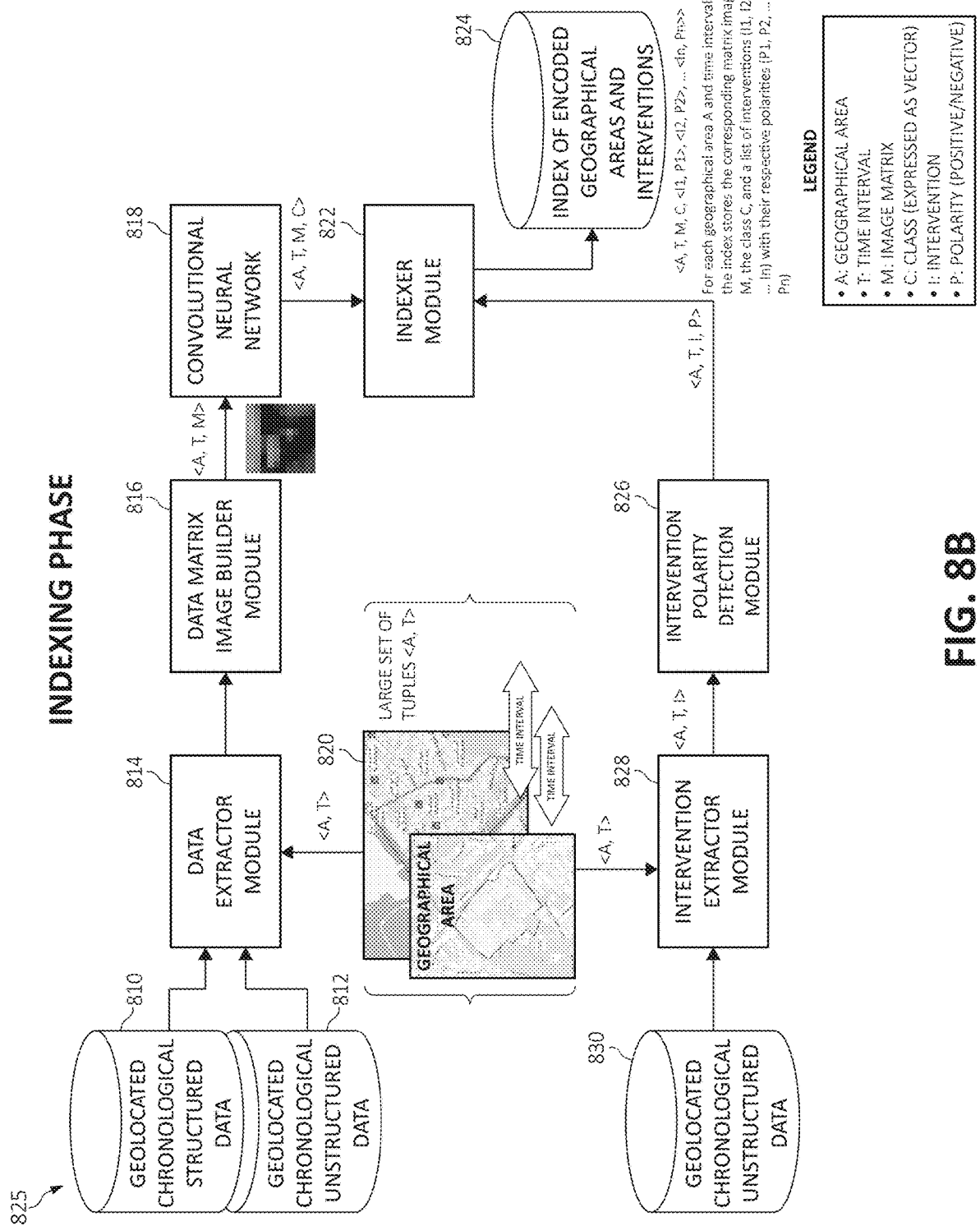

Turning now to FIG. 8B, upon completion of and/or in parallel with the training phase of training phase of FIG. 8A, in an indexing phase 825, a searchable index of classified geographical areas and respective land-use intervention may be built, created, and/or generated by the indexer module 822 using data from known geographical areas, in the form of the set of tuples 820 where A is a geographical area, and T is a time interval. For example, for each geographical area A and time interval T, an index 824 (e.g., an index of encoded geographical areas and interventions) stores the corresponding the image matrix M such as, for example, the matrix $M_{i,n}$ 640 of FIG. 6, the class C, and a list of interventions ($I_1, I_2, \ldots, I_n$) with their respective polarities ($P_1, P_2, \ldots, P_n$).

In parallel with the training phase of FIG. 8A, a natural language processing ("NLP") pipeline may be used to extract land-use intervention facts/statements from a corpus of text, and to detect their polarity (e.g., positively/negatively perceived). It should be noted that the NLP pipeline may include the intervention extraction module 828 and intervention polarity detection module 826, and may be based on NLP components and perform various of NLP operations. The NLP pipeline (e.g., the intervention extraction module 828 and intervention polarity detection module 826) associates each tuple with one or more tuples, where I represents a land-use intervention, and P its polarity. Finally, the indexer module 822 may write all the above information into the searchable index 824.

In one aspect, a corpus of texts describing each land intervention includes documents from one or more data sources such as, for example, official documents from municipalities, government agencies, news (e.g., where journalists/experts describe land interventions), newspapers, editorials, journals, publications, announcements, advertisements, social media network/accounts where people/users describe how they perceive an intervention. Also, the corpus of texts describing land intervention may evolve in time and therefore the indexing phase of FIG. 8B may be periodically repeated. Therefore, an evolving and open-ended list of land-use interventions and related polarities may be collected.

Figure 8C:
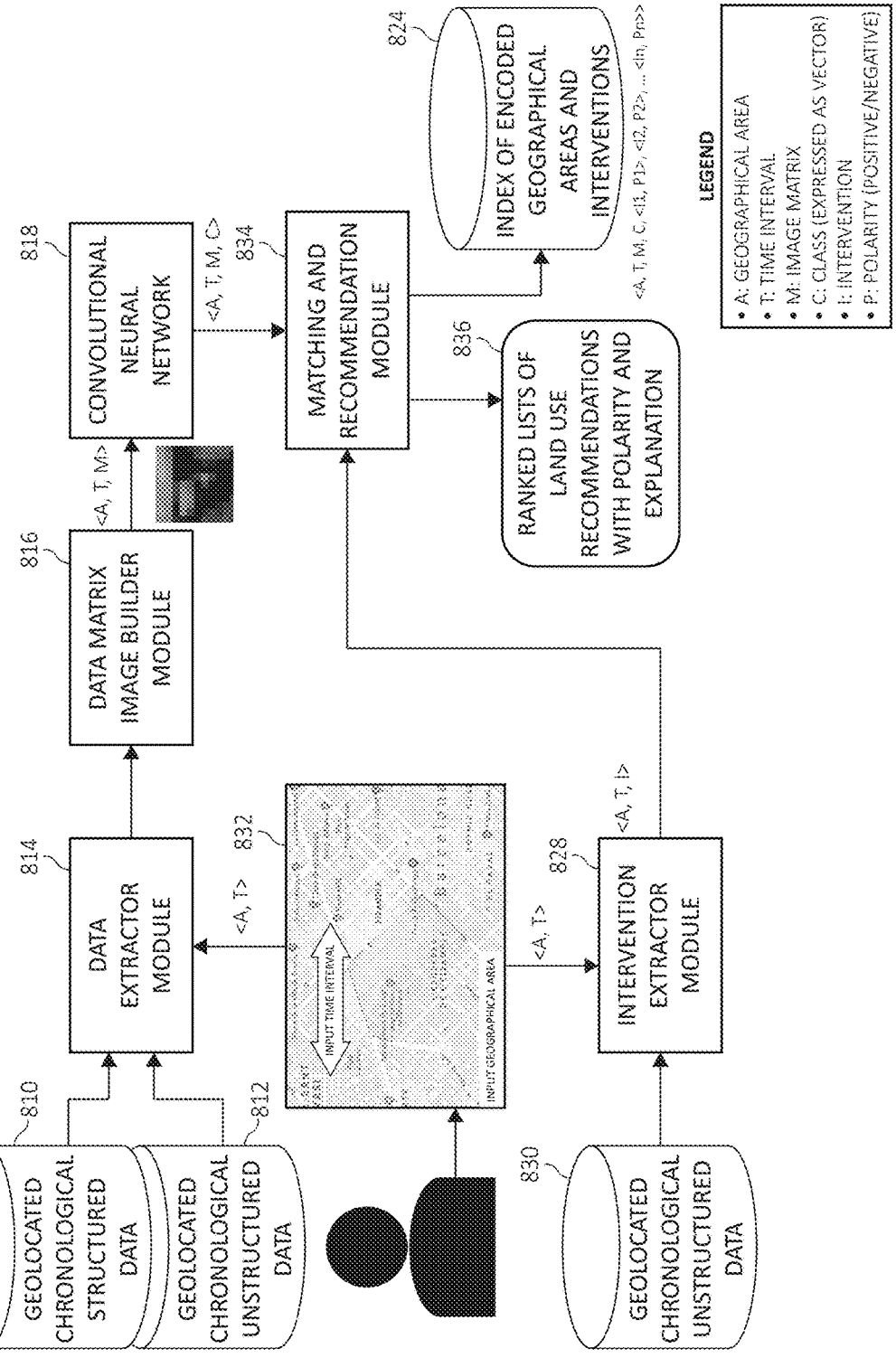

Turning now to FIG. 8C, a matching and recommendation phase 835 may be executed where in the matching and recommendation phase, a user (a land-use planner) may provide as input a geographical area "A", and a time interval "T" such as, for example input 832. The training phase of FIG. 8A may be performed as the initial operations of the matching and recommendation phase 835.

The tuple may be taken as input by the matching and recommendation module 834, which uses the index 824 (built during the indexing phase), to identify, located, and/or find the most similar geographical areas to A. In one aspect, "similarity" may be determined or computed based on the class vector C (e.g., several similarity metrics may be used, for example cosine similarity). The matching and recommendation module 834 may build, create, and/or generate two ranked list of recommendations of land-use interventions (e.g. positively perceived land-use interventions and negatively perceived land-use interventions) by sorting the tuples (e.g., land-use intervention, polarity) of those geographical areas that are similar to A (e.g., from the most similar to the least similar). Finally, those land-use interventions that are already associated to the input area A may be removed from the recommendation lists, which can be identified through the intervention extraction module 828 in the NLP pipeline.

Also, an explanation 836 for each (positive/negative) recommendation may be provided by the matching and recommendation module 834. The explanation may be, for example, a ranked list of land use recommendations and polarity and explanation. The explanation 836 may include, for example, a list of paragraphs extracted from the collection of texts describing land interventions" providing evidence of the suggested land-use intervention and their polarities (positive/negative). Additionally, the explanation 836 may include information about the similar geographical areas, where such information may include structured and unstructured data in the input time interval. Including this information provides evidence of how/why two geographical areas are similar.

Figure 8D:
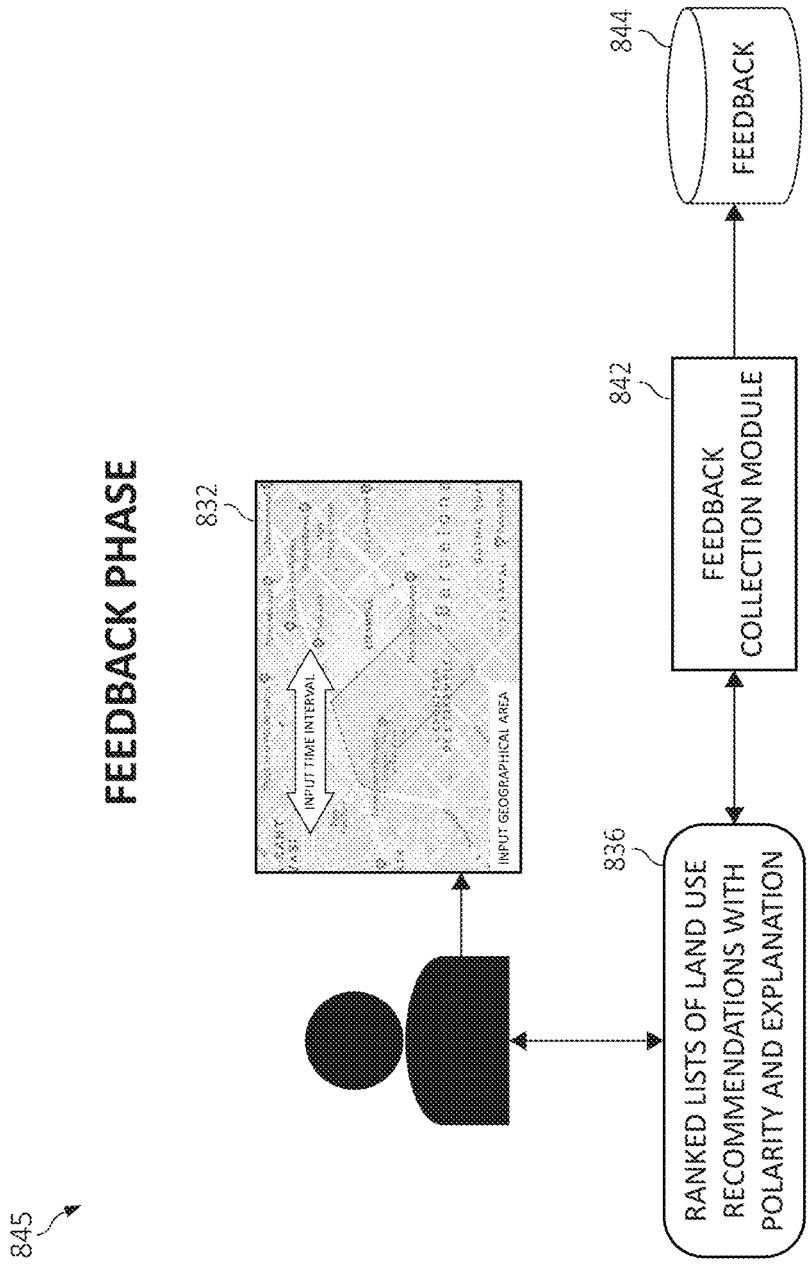

During a feedback phase, as illustrated in FIG. 8D, a user may examine the two lists of recommendations and provide feedback 844 via a feedback collection module 842. The feedback 844 may represent a perceived accuracy/usefulness of the recommendation. The feedback 844 may include an upvote and/or downvote, and/or a discrete value such as, for example, an integer from 1 to 5.

The feedback collection module 842 may collect the user feedback such as, for example, feedback related to the explanation 836 (e.g., the ranked list of land use recommendations with polarity and explanation) and store the feedback into a feedback database 844, which can then be used by the other modules (particularly the matching and recommendation module 834 to improve the accuracy of future recommendations).

Figure 9:
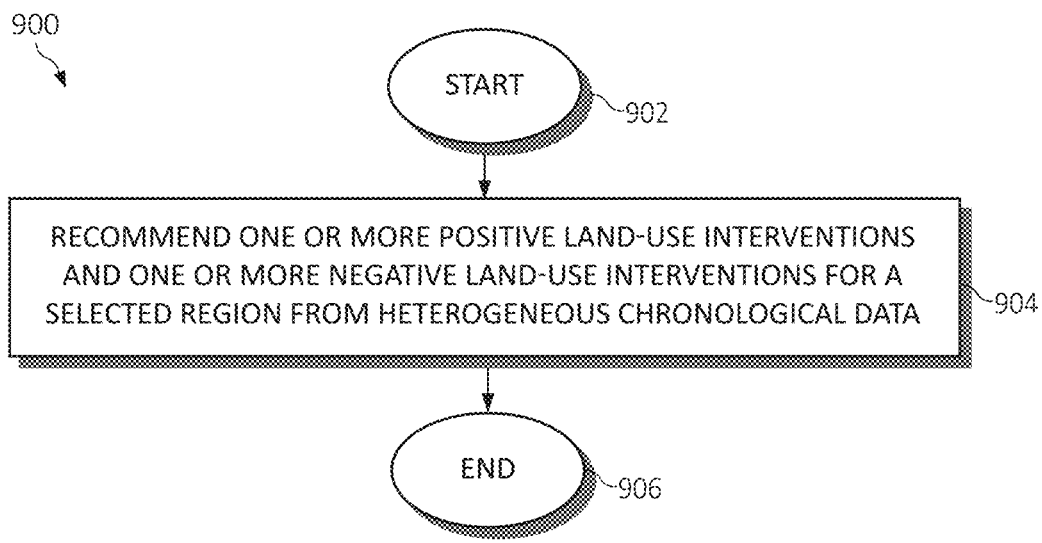
FIG. 9 is a flowchart diagram depicting an exemplary method for providing intelligent land use planning recommendations using heterogeneous temporal datasets in a computing environment by a processor, again in which aspects of the present invention may be realized.

Turning now to FIG. 9, a method 900 for providing intelligent land use planning recommendations using heterogeneous temporal datasets in a computing environment by a processor is depicted, in which various aspects of the illustrated embodiments may be implemented. The functionality 900 may be implemented as a method executed as instructions on a machine, where the instructions are included on at least one computer readable medium or one non-transitory machine-readable storage medium. The functionality 900 may start in block 902.

One or more positive land-use interventions, one or more negative land-use interventions, or a combination thereof may be recommended for a selected geographical region from heterogeneous chronological data, as in block 904. The functionality 900 may end, as in block 906.

In one aspect, in conjunction with and/or as part of at least one block of FIG. 9, the operations of method 900 may include each of the following. The operations of method 900 may identify one or more geographical regions having one or more similar characteristics or features to the selected region, and/or use the heterogeneous chronological data is used to identify the one or more similar characteristics or features. The heterogeneous chronological data includes both structured data and unstructured data.

The operations of method 900 may learn the one or more positive land-use interventions, the one or more negative land-use interventions, or a combination thereof from one or more data sources during a selected time period, and/or collect feedback data relating to the one or more positive land-use interventions, the one or more negative land-use interventions, or a combination.

The operations of method 900 may associate the one or more positive land-use interventions, the one or more negative land-use interventions, or a combination thereof to support data or non-support data.

The operations of method 900 may 1) represent the heterogeneous chronological data of the selected geographical region as images, 2) train and classify the images using a machine learning operation, 3) index both data of the images and associated text data describing land-use interventions in the selected geographical region, and/or 4) recommend a list of positive land-use interventions and a list of negative land-use interventions of similar geographical areas and providing supporting evidences with the list of positive land-use interventions and the list of negative land-use interventions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing intelligent land use planning recommendations using heterogeneous temporal datasets in a computing environment by a processor, comprising:
    receiving heterogeneous temporal datasets from a plurality of data sources, wherein at least a portion of the heterogeneous temporal datasets includes land use information of land regions, the land use information including environmental data, activity data of retail and commercial, services offered in the land regions, and traffic and route profile data servicing the land regions, and wherein at least another portion of the heterogeneous temporal datasets includes images of the land regions having encoded therein features representing characteristics of the land regions that change over time such that a recommended intervention of the land changes over time according to the characteristics of the land regions;
    executing machine learning logic to generate a land use model trained in a first training stage using the heterogeneous temporal datasets, wherein training the land use model in the first training stage includes:
        extracting, from each of a set of tuples of the heterogeneous temporal datasets comprising a geographical area tuple and a time interval tuple, geolocated heterogeneous chronological data related to a first time interval of a plurality of time intervals,
        encoding the geolocated chronological data into an image matrix for the first time interval,
        training the land use model using the image matrix to generate a classifier to associate a class to the image matrix, and
        indexing both data of the images and associated text data describing land-use interventions in the selected geographical region, wherein an index of encoded geographical areas and interventions stores the data of the images and associated text data in a structured format comprising, for each geographical area tuple and time interval tuple, the image matrix, the class, a list of land-use interventions associated with the image matrix at the plurality of time intervals, and a corresponding polarity of a positive land-user intervention and a negative land-use intervention respectively assigned to each of the list of land-use interventions;
    identifying, using the land use model, one or more geographical regions of the land regions having one or more similar characteristics or features to a selected geographical region, wherein the identifying includes matching features representing characteristics encoded within an image of the selected geographical region to the features representing the characteristics of at least one of the land regions by sorting the tuples of the geolocated heterogeneous chronological data to identify the one or more similar characteristics or features;
    recommending one or more positive land-use interventions, one or more negative land-use interventions, or a combination thereof for the selected geographical region from the geolocated heterogeneous chronological data according to the generated land-use model, wherein the recommending includes suggesting the recommended intervention of the land of the selected geographical region according to the land use information of the one or more geographical regions during a given one of the plurality of time intervals in which the one or more similar characteristics or features are identified;
    collecting feedback data relating to the one or more positive land-use interventions, the one or more negative land-use interventions, or the combination thereof; and
    executing the machine learning logic to re-train, in a second training stage, the land use model according to the feedback data, wherein re-training the land use model in the second training stage utilizes the feedback data to iteratively enhance an accuracy of the recommendations of the one or more positive land-use interventions, the one or more negative land-use interventions, or the combination thereof.

2. The method of claim 1, further including using the geolocated heterogeneous chronological data is used to identify the one or more similar characteristics or features, wherein the geolocated heterogeneous chronological data includes both structured data and unstructured data.

3. The method of claim 1, further including learning the one or more positive land-use interventions, the one or more negative land-use interventions, or a combination thereof from one or more data sources during a selected time period.

4. The method of claim 1, further including associating the one or more positive land-use interventions, the one or more negative land-use interventions, or a combination thereof to support the recommendation or non-support the recommendation.

5. The method of claim 1, further including:
    classifying the images using the machine learning logic, wherein the images are used as input when performing the training; and
    recommending a list of positive land-use interventions and a list of negative land-use interventions of similar geographical areas and providing supporting evidences with the list of positive land-use interventions and the list of negative land-use interventions.

6. A system for providing intelligent land use planning recommendations using heterogeneous temporal datasets in a computing environment, comprising:
   one or more computers with executable instructions that when executed cause the system to:
   receive heterogeneous temporal datasets from a plurality of data sources, wherein at least a portion of the heterogeneous temporal datasets includes land use information of land regions, the land use information including environmental data, activity data of retail and commercial services offered in the land regions, and traffic and route profile data servicing the land regions, and wherein at least another portion of the heterogeneous temporal datasets includes images of the land regions having encoded therein features representing characteristics of the land regions that change over time such that a recommended intervention of the land changes over time according to the characteristics of the land regions;
   execute machine learning logic to generate a land use model trained in a first training stage using the heterogeneous temporal datasets, wherein training the land use model in the first training stage includes:
      extracting, from each of a set of tuples of the heterogeneous temporal datasets comprising a geographical area tuple and a time interval tuple, geolocated heterogeneous chronological data related to a first time interval of a plurality of time intervals,
      encoding the geolocated chronological data into an image matrix for the first time interval,
      training the land use model using the image matrix to generate a classifier to associate a class to the image matrix, and
      indexing both data of the images and associated text data describing land-use interventions in the selected geographical region, wherein an index of encoded geographical areas and interventions stores the data of the images and associated text data in a structured format comprising, for each geographical area tuple and time interval tuple, the image matrix, the class, a list of land-use interventions associated with the image matrix at the plurality of time intervals, and a corresponding polarity of a positive land-user intervention and a negative land-use intervention respectively assigned to each of the list of land-use interventions;
   identify, using the land use model, one or more geographical regions of the land regions having one or more similar characteristics or features to a selected geographical region, wherein the identifying includes matching features representing characteristics encoded within an image of the selected geographical region to the features representing the characteristics of at least one of the land regions by sorting the tuples of the geolocated heterogeneous chronological data to identify the one or more similar characteristics or features;
   recommend one or more positive land-use interventions, one or more negative land-use interventions, or a combination thereof for the selected geographical region from the geolocated heterogeneous chronological data according to the generated land-use model, wherein the recommending includes suggesting the recommended intervention of the land of the selected geographical region according to the land use information of the one or more geographical regions during a given one of the plurality of time intervals in which the one or more similar characteristics or features are identified;
   collect feedback data relating to the one or more positive land-use interventions, the one or more negative land-use interventions, or the combination thereof; and
   execute the machine learning logic to re-train, in a second training stage, the land use model according to the feedback data, wherein re-training the land use model in the second training stage utilizes the feedback data to iteratively enhance an accuracy of the recommendations of the one or more positive land-use interventions, the one or more negative land-use interventions, or the combination thereof.

7. The system of claim 6, wherein the executable instructions use the geolocated heterogeneous chronological data is used to identify the one or more similar characteristics or features, wherein the geolocated heterogeneous chronological data includes both structured data and unstructured data.

8. The system of claim 6, wherein the executable instructions learn the one or more positive land-use interventions, the one or more negative land-use interventions, or a combination thereof from one or more data sources during a selected time period.

9. The system of claim 6, wherein the executable instructions associate the one or more positive land-use interventions, the one or more negative land-use interventions, or a combination thereof to support the recommendation or non-support the recommendation.

10. The system of claim 6, wherein the executable instructions:
   classify the images using the machine learning logic, wherein the images are used as input when performing the training; and
   recommend a list of positive land-use interventions and a list of negative land-use interventions of similar geographical areas and providing supporting evidences with the list of positive land-use interventions and the list of negative land-use interventions.

11. A computer program product for, by a processor, providing intelligent land use planning recommendations using heterogeneous temporal datasets, the computer program product comprising a non-transitory computer-readable storage medium having computer-readable program code portions stored therein, the computer-readable program code portions comprising:
   an executable portion that receives heterogeneous temporal datasets from a plurality of data sources, wherein at least a portion of the heterogeneous temporal datasets includes land use information of land regions, the land use information including environmental data, activity data of retail and commercial services offered in the land regions, and traffic and route profile data servicing the land regions, and wherein at least another portion of the heterogeneous temporal datasets includes images of the land regions having encoded therein features representing characteristics of the land regions that change over time such that a recommended intervention of the land changes over time according to the characteristics of the land regions;
   an executable portion that executes machine learning logic to generate a land use model trained in a first training stage using the heterogeneous temporal datasets, wherein training the land use model in the first training stage includes:

extracting, from each of a set of tuples of the heterogeneous temporal datasets comprising a geographical area tuple and a time interval tuple, geolocated heterogeneous chronological data related to a first time interval of a plurality of time intervals, encoding the geolocated chronological data into an image matrix for the first time interval, training the land use model using the image matrix to generate a classifier to associate a class to the image matrix, and indexing both data of the images and associated text data describing land-use interventions in the selected geographical region, wherein an index of encoded geographical areas and interventions stores the data of the images and associated text data in a structured format comprising, for each geographical area tuple and time interval tuple, the image matrix, the class, a list of land-use interventions associated with the image matrix at the plurality of time intervals, and a corresponding polarity of a positive land-user intervention and a negative land-use intervention respectively assigned to each of the list of land-use interventions;

an executable portion that identifies, using the land use model, one or more geographical regions of the land regions having one or more similar characteristics or features to a selected geographical region, wherein the identifying includes matching features representing characteristics encoded within an image of the selected geographical region to the features representing the characteristics of at least one of the land regions by sorting the tuples of the geolocated heterogeneous chronological data to identify the one or more similar characteristics or features;

an executable portion that recommends one or more positive land-use interventions, one or more negative land-use interventions, or a combination thereof for the selected geographical region from the geolocated heterogeneous chronological data according to the generated land-use model, wherein the recommending includes suggesting the recommended intervention of the land of the selected geographical region according to the land use information of the one or more geographical regions during a given one of the plurality of time intervals in which the one or more similar characteristics or features are identified;

an executable portion that collects feedback data relating to the one or more positive land-use interventions, the one or more negative land-use interventions, or the combination thereof; and an executable portion that executes the machine learning logic to re-train, in a second training stage, the land use model according to the feedback data, wherein re-training the land use model in the second training stage utilizes the feedback data to iteratively enhance an accuracy of the recommendations of the one or more positive land-use interventions, the one or more negative land-use interventions, or the combination thereof.

12. The computer program product of claim 11, further including an executable portion that uses the geolocated heterogeneous chronological data is used to identify the one or more similar characteristics or features, wherein the geolocated heterogeneous chronological data includes both structured data and unstructured data.

13. The computer program product of claim 11, further including an executable portion that learns the one or more positive land-use interventions, the one or more negative land-use interventions, or a combination thereof from one or more data sources during a selected time period.

14. The computer program product of claim 11, further including an executable portion that associates the one or more positive land-use interventions, the one or more negative land-use interventions, or a combination thereof to support the recommendation or non-support the recommendation.

15. The computer program product of claim 11, further including an executable portion that:

classifies the images using the machine learning logic, wherein the images are used as input when performing the training; and recommends a list of positive land-use interventions and a list of negative land-use interventions of similar geographical areas and providing supporting evidences with the list of positive land-use interventions and the list of negative land-use interventions.

* * * * *